June 24, 1941.   T. P. CONLON   2,247,220
COMBINATION MECHANISM FOR KEYLESS LOCKS, BOLTS, AND LOCKING DEVICES
Filed March 20, 1939   4 Sheets-Sheet 1
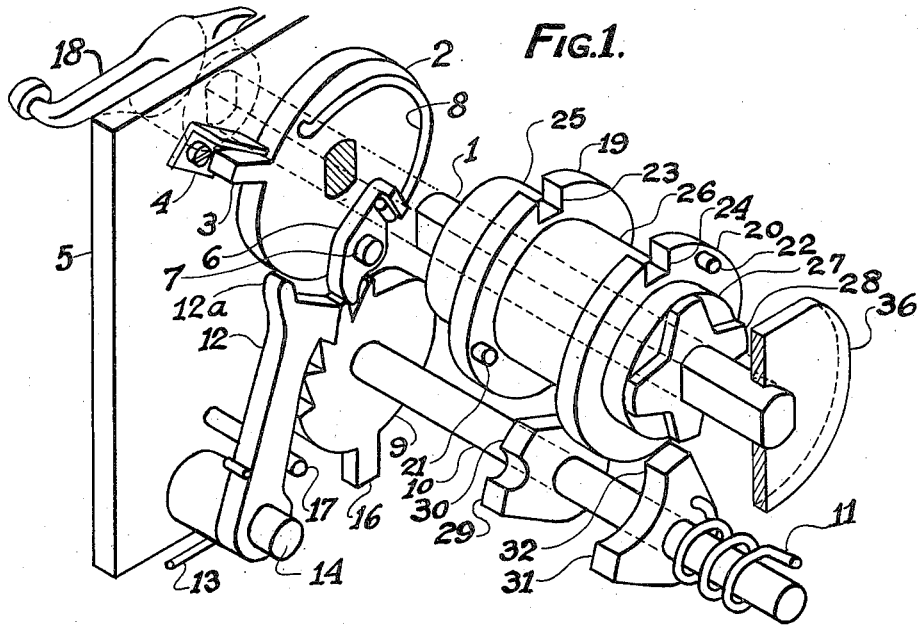
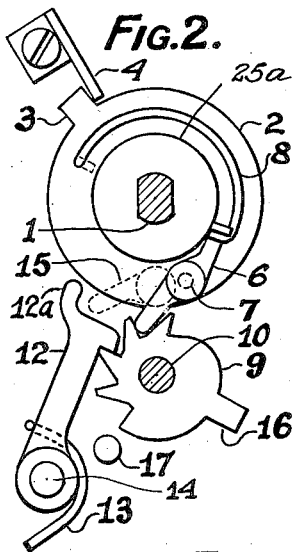
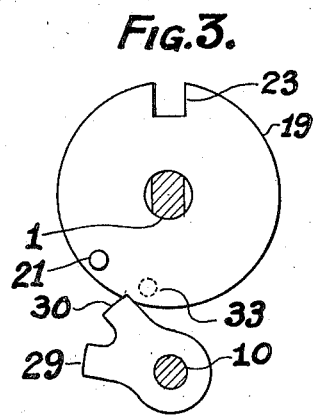
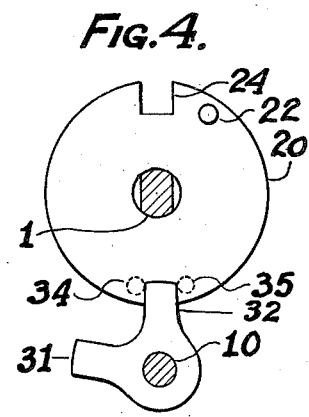
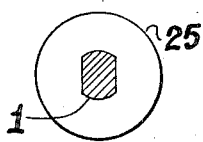
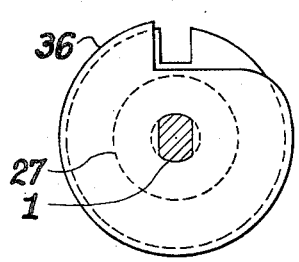
INVENTOR
Thomas P. Conlon June 24, 1941. T. P. CONLON 2,247,220
COMBINATION MECHANISM FOR KEYLESS LOCKS, BOLTS, AND LOCKING DEVICES
Filed March 20, 1939 4 Sheets-Sheet 2
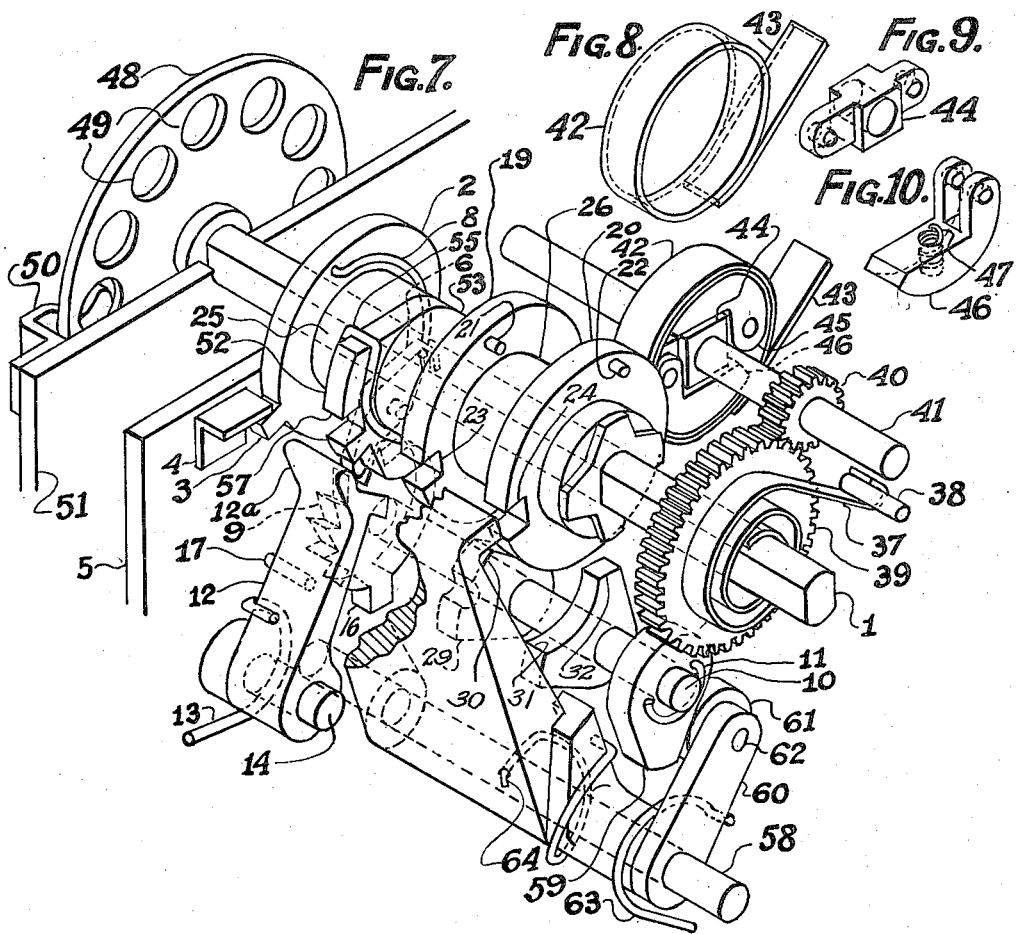
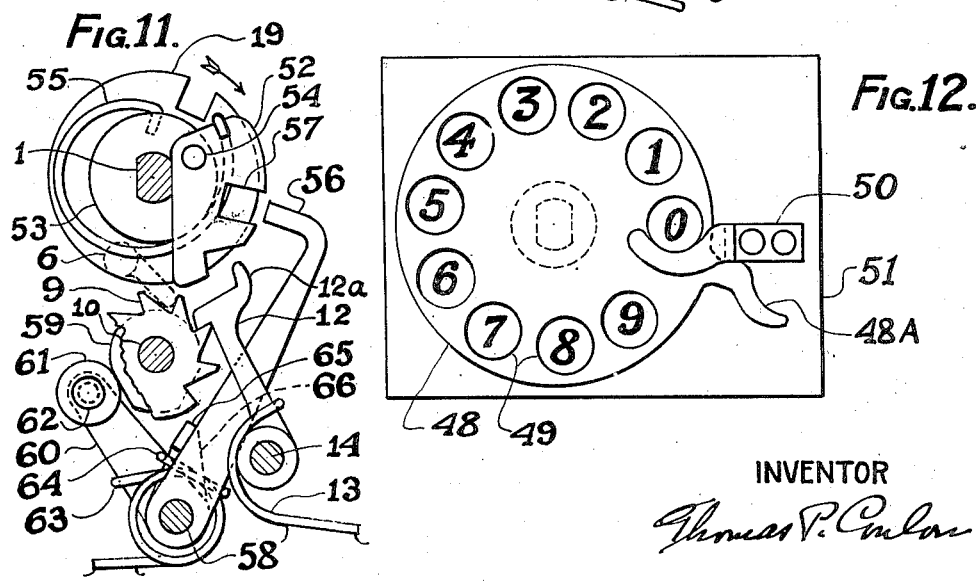
INVENTOR
Thomas P. Conlon

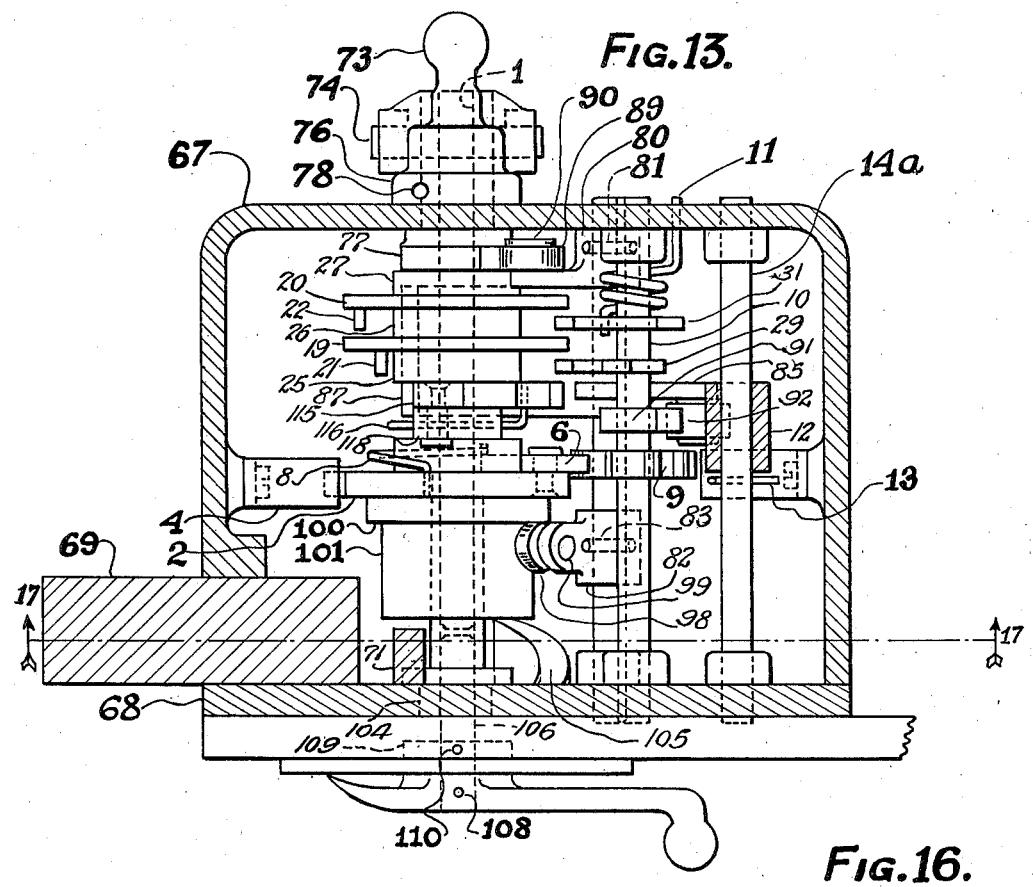

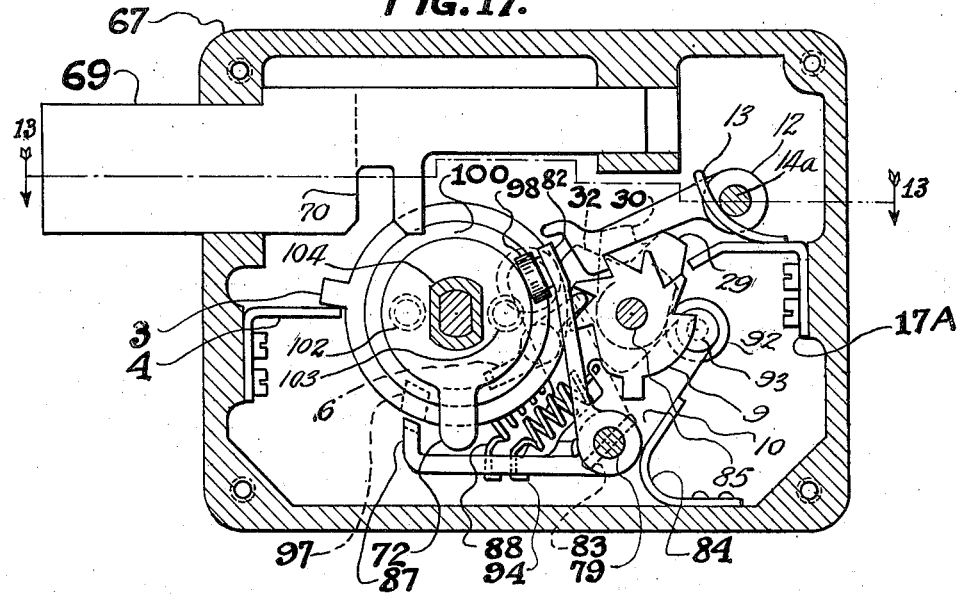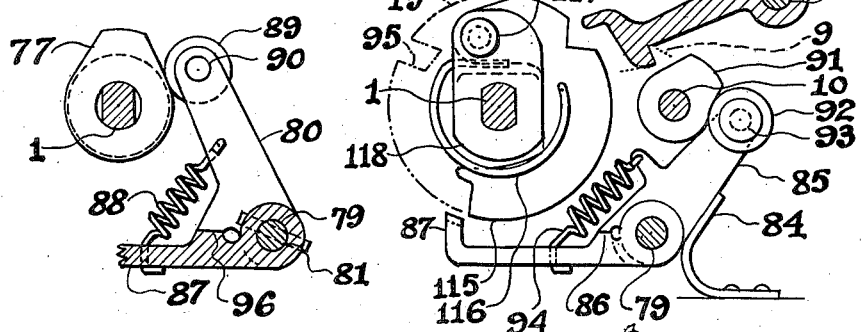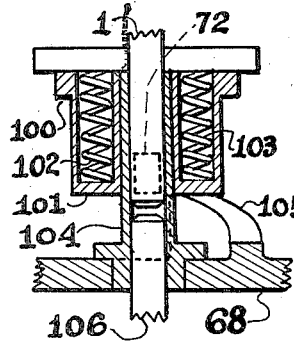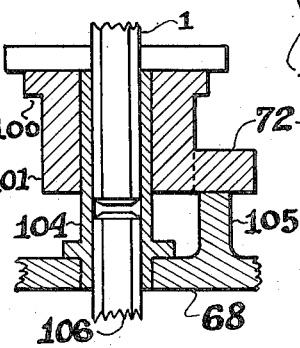

Patented June 24, 1941

2,247,220

UNITED STATES PATENT OFFICE 2,247,220

COMBINATION MECHANISM FOR KEYLESS LOCKS, BOLTS, AND LOCKING DEVICES

Thomas P. Conlon, New York, N. Y.

Application March 20, 1939, Serial No. 262,837

12 Claims. (Cl. 70—305)

My invention relates to improvements in combination mechanism for keyless locks, bolts, and locking devices.

The objects of my invention are: first, to provide a keyless combination mechanism for locks that can be operated for locking and for unlocking from a dial or handle, whose movement for speed, accuracy and simplicity is limited to about one revolution, that is about 360 degrees, and return, within which limits the indexing of the successive characters forming the combination can be performed in one direction from a stop; second, to provide a combination mechanism that can be adapted for automatic return between the successive dialing operations; third, to provide a combination mechanism that can be applied in the present well known forms of combination locks, such as safe locks, vault locks, etc., in which the application of combination mechanisms is well known to the art; fourth, to provide a combination mechanism that can be applied to house and automobile doors and the like, which differ from the safe locks in that the house or automobile door lock should have only one handle on the outside and one handle on the inside, which is not the requirement of the ordinary safe lock; fifth, to provide a combination mechanism so devised as to be safe against the discovery of the secret combination by an intruder.

I attain these objects by mechanism illustrated in the accompanying drawings, in which:

Figure 1 is a perspective view of a simple form of my invention, Fig. 2 is a detailed sectional view of the stops, pawls, ratchet and latch, Fig. 3, a similar view showing one of the tumbler disks and the associated fingers, Fig. 4, a similar view of the other disk and its associated fingers, Fig. 5, a similar view of a spacing collar, and Fig. 6, a similar view of the device provided in this form to guard against the discovery of the combination by an intruder.

Fig. 7 is a perspective view of another form of my invention providing automatic return for the indexing dial, and providing a guard against discovery of the secret combination that is adapted to withdraw the tumbler arm. Figs. 8, 9, and 10 are perspective views of the details of the centrifugal brake used to slow the return. Fig. 11 is a detail view of the mechanism used to guard against discovery of the secret combination, and Fig. 12, a front view of the indexing dial shown in Fig. 7.

Fig. 13 is a sectional elevation taken on line 13—13, Fig. 17, of another form of my invention. A bolt and housing are shown to illustrate the application of the mechanism in a lock. Figs. 14 and 15 are detail views of the inside handle, and Fig. 16, a front view of the dial and outside handle shown in Fig. 13. Fig. 17 is a sectional view taken on the line 17—17 in Fig. 13; Figs. 18 and 19 are detail views of parts of the mechanism as viewed in the same direction as the view in Fig. 17; Fig. 20 is a sectional plan detail view of the sliding member, the view being taken in the same direction as that in Fig. 13. Fig. 21 is a section detail view of the said sliding member the view being taken on the line 21—21 in Fig. 22.

Figs. 22 and 23 are diagrammatic, the position of the sliding member in Fig. 22 is shown with the key form advanced in a clockwise direction to the end of the travel in that direction, the outline of the resetting cam being shown by the line of dash and two dots; and the developed outline of the cam is shown by the solid line in Fig. 23.

Referring to the drawings and more particularly to Figs. 1 to 6 inclusive, a dial shaft 1, partly round and partly flattened, so as to act as if it were splined, carries and rotates a pawl plate 2, a projection 3 of which, by engagement with a stationary plate 4, on the housing 5, forms a rotation stop to the movement of the shaft 1 and all the parts that rotate with the said shaft 1, one of which parts is the pawl 6, on the stud pin 7. The bail of the pawl 6 is held by the spring 8 against the spacing collar 25a, Fig. 2, so that the nose of the pawl is in proper position to engage the ratchet 9, which is attached to and moves the ratchet shaft 10.

The spring 11 tends to return the ratchet 9 when the latch 12 is tripped against the action of the spring 13, which tripping can be done by the pawl 6 in returning to the position shown from the position at 15 shown in dotted lines. The latch 12 pivots on the stud 14, and its nose 12a is adapted to be caught by the pawl 6 to free the ratchet 9 and let it turn by the action of the spring 11 to the stopped position at which the lug 16 strikes the pin 17.

The handle 18 is provided for the limited rotation of the dial shaft from the stop shown through any predetermined angle for indexing or to the limit of the stops in both directions for calling. By "bailing" is meant the setting, as hereinafter described, of the combination disks and the associated mechanism in a position for the start of the operation of indexing the combination, to open the lock, by the manual operation of the indexing handle.

Tumbler disks, 19 and 20, are provided with pin form projections 21 and 22, adapted for engagement with the bailing fingers 29 and 31 and the indexing fingers 30 and 32. All of the fingers are attached to the ratchet shaft 10 and moved into and out of the path of the pin form projections as the ratchet is advanced or is returned to the stop. The tumbler disks are spaced between spacing collars 25, 26, and 27 and can turn on the rounded part of the shaft except as their motion is prevented by the friction of the spacing collars which cannot turn on the shaft but are free to press against the tumbler disks impelled by the thrust of the spring washer 28. The indexing and bailing is done against this friction as a pin strikes against a finger positioned by the ratchet. To prevent a tumbler bar or arm, or in some locks the bolt, from pressing against the tumbler disks and finding the tumbler slots as the dial shaft is rotated, I have provided, in this simple form of my invention, the cammed disk 36 which is attached to and rotates with the shaft.

In the form of my invention shown in Figs. 7 to 12 inclusive, the automatic spring return of the dial and the dial shaft to the stopped position has been provided for by the spring 37 attached to the dial shaft 1, and the stationary pin 38. The spring return is slowed down through the gear 39 which meshes with the pinion 40 turning the auxiliary shaft 41 to which is attached the center piece 44. The weighted arms 45 and 46 are hinged on pins in the center piece 44, and are pressed by the springs 47 against the brake band 42 which has a holddown strap 43 for attachment to the casing of the lock or bolt. The dial 48 is a disk in which there are holds 49 through which the characters, shown in Fig. 12 as the digits starting with zero from one to nine appear through the holes, the said digits being marked on the plate 51. The dial 48 has a bailing lug 48A, which also acts as an auxiliary stop against the rest 50.

The guard against tampering, in this form of my invention, is shown in detail in Fig. 11, in which the latch 12 is made not only to cover the ratchet but is extended so that the nose 12a will be engaged by the kick plate 52 if the dial shaft is moved any appreciable distance in the direction of the arrow after coming to rest at the position shown, but with the tumbler arm 56 pressed against an unindexed tumbler disk. The kick plate 52 can turn on the stud pin 54; but is held against the shaft 1 by the spring 55. The tumbler arm 56 seeks to register the alignment of the slots in the tumbler disks when the ratchet 9 has advanced the cam 59 to lift the lever 60 through the roller 61 which rides on the cam and is carried on the stud pin 62 in the lever. The roller 61 is pressed against the cam 59 by the spring 63. The tumbler arm 56 is held against the stop 65 on the stub-arm bellcrank 66 of the lever 60 by the spring 64, which is flexed if the tumbler arm 56 cannot enter all the tumbler slots when the roller 61 is lifted by the cam 59. By this arrangement when the kick plate 52 lifts the latch 12, the cam 59 will allow the tumbler arm to move away from the slots.

The application of the foregoing forms of my invention to a very large variety of locks having extra handles for the actual withdrawal of the bolt is a simple matter and well known to the art as locks employing slots and holes in indexed disks have been used for a number of years and found innumerable applications.

But my invention has a further application, as by it a lock can be operated from a single handle or dial on the outside of a door and a single handle on the inside; and by means of these handles can as desired (I) be used as a simple catch, using either handle to project and withdraw the bolt, (II) be locked on either the outside or inside and the combination bailed, (III) when locked can only be opened from the outside by indexing the combination first, (IV) when locked can be immediately opened from the inside handle without working out the combination. This form of my invention is shown as housed and acting upon a simple bolt.

In this modified form of my invention, the same following parts are used as in the simple form and are given the same reference numbers as applied above and perform the same functions. The stop for the ratchet takes the form as shown at 17A in Figs. 13 and 17. As the springs 102 and 103 can be given the additional function to cause friction between the tumbler disks and the spacing collars, the spring washer 28 of the simple form has been discarded. The slots in the tumbler disks 19 and 20 assume the shape shown at 95 in Fig. 19.

The inside handle 73 swings on the hinge pin 74, and is shown in Figs. 14 and 15 as raised and in position to form a cinch at 75 with the dial shaft 1, by the matching arcs having a slight cam action. The pin 74 is carried by the hubbed collar 76, which is pinned to the sleeve of the cam 77 by the pin 78. In Figs. 14 and 15, the inside handle 73 is shown as cinched to the shaft 1. In this position it is adapted to open the lock and withdraw the bolt, and it can override the locked combination to accomplish those results. When the inside handle 73 is turned for about 180 degrees on the axis of the hinge pin 74, from the position as shown in Figs. 14 and 15, the dial shaft 1 will be freed and the inside handle 73 will be then adapted to act as a plumb weight to hold the cam 77 from turning on the axis of the dial shaft.

To the rockshaft 79, the lever 80 is pinned by the pin 81, and to the same rockshaft is also pinned the lever 82 by the pin 83, so that the spring 84 pressing against the lever 85 which is not pinned to the rockshaft 79, will communicate the pressure to the tumbler arm 87 through the stop between them at 86, Fig. 19, and the tumbler arm will carry the pressure on to the lever 80 through the spring 88, so that the roller 89, on the stud pin 90 will follow the cam 77, provided that cam is not at a low point while the cam 91, which is attached to the ratchet shaft 10, is at a high point. When the cam 91 is at a high point it lifts the roller 92 on the stud pin 93 in the said lever 85, and if the tumbler arm 87 cannot enter all the slots in the tumbler disks the spring 94 will be flexed and the motion will stop in the tumbler arm; but if the tumbler arm can enter all the slots in the tumbler disks the lift of the lever 85 will carry through the spring 94, and through the tumbler arm 87, and through the stop 96 to the lever 80, which is pinned to the rockshaft 79, the same as if the lever 80 was lifted by the cam 77, and will lift the lever 82, and free its roller 98 on the pin 99, from the track 100, which has the form of a shoulder (without any cam action) on the sliding member 101, which the roller 98 holds against the springs 102 and 103, and which member is also shaped to form the key form 72.

When the roller 98 is freed from the track 100, the member 101 will slide forward on the sleeve 104, and assume a position for the key form 72 to be in line in plan view with the key slot withdrawal side at 71 (Fig. 13).

The sleeve 104 fits the flatted splines of both the dial shaft 1 and the connecting shaft 106. This sleeve 104 has a flanged portion to act as a collar to hold it in its proper position for a bearing in the cover plate 68, and the sleeve 104 is also provided with exterior flatted surfaces to act as a spline for the sliding member 101.

The cam 105, at the end of the indexing rotation to the stop of the dial shaft 1, forces back the sliding member 101 against the springs 102 and 103 as the front face of the key form 72 engages it. The cam 105 is formed on the cover plate 68, and its action is such that the member 101 is returned to a position where the roller 98 can engage the shoulder 100, and in this position the key form 72 passes clear of the withdrawal side of the key slot 70, as narrowed at 71, but will engage with the other side of the key slot 70 of the bolt 69. This arrangement is provided to prevent the key form coming to a stopped position at which it could not project the bolt.

The connecting shaft 106 is pinned to the indexing lever 107, by the pin 108, and to the collar 109 by the pin 110. The screws 111, hold the index plate 112 to the outside surface of the door. The digit index 113 starts with the arrowhead as the return position of the pointer of the handle 107, and this return position corresponds with the position shown in Fig. 17 for the projection 3 as stopped against the stationary plate 4. The digits up to nine, Fig. 16, form the index of the dial, and the exact position of each character of the index is indicated by the marks 114. The zero which follows the nine as an index character is the limit of the motion of the index handle in a clockwise direction as viewed in Fig. 16, and it is not one of the characters that can be used for the number of the combination for that particular dial, but is one of the limits of motion for bailing.

For this form I have provided as a guard the kick plate 115, shown in Fig. 19, as held by the spring 116 in its retracted position on the stud pin 117, which turns in the special collar 118, against which the spring holds the kick plate. The kick plate 115 and the latch 12 have the same functions as already described.

The operation of all forms of this invention are similar, in all forms the operation of bailing must be performed before the indexing of the successive characters as a combination is attempted. The bailing operation consists in turning the indexing handle or dial in the direction used for indexing to the limit of the stop in that direction and then returning the indexing handle or dial to its stopped position in the other direction. The bailing operation sets all the pin form projections in an alignment with each other, while the indexing operation sets all the tumbler slots in an alignment with each other. The bailing fingers are in an alignment and act together, while the indexing fingers are successively advanced to engagement with the pin form projections on the tumbler disks.

When the indexing handle or dial has been advanced to its limit of motion in the indexing direction, the pawl 6 will have advanced to a position corresponding to the position 15, Fig. 2, and upon the first part of the return motion of the indexing handle, the pawl 6 will trip the latch 12, that is raise it so that ratchet 9 is no longer held by it for a short period to allow the spring 11 to return the ratchet, and with it the ratchet shaft to its stopped position, when the lug 16 stops against the pin 17. As the bailing fingers 29, Fig. 3, and 31, Fig. 4, are attached to the ratchet shaft, they will both be returned to a position similar, in relation to the tumbler disks, to the position shown for the indexing finger 32 in Fig. 4. And in this position the bailing fingers will engage the pin form projections 21 and 22, as the pin form projections are brought by the dial shaft to positions corresponding to the dotted position 35 in Fig. 4. The final position of the pin form projections will not be at or similar to the dotted position 35 when the dial shaft has come to its stopped position on its return movement, but will have all been moved around the dial shaft as a center to final positions shown as the dotted positions 33, Fig. 3, and 34, Fig. 4. This is due to the action of the pawl 6 engaging with a tooth of the ratchet 9, and moving the bailing fingers 29 and 31 out of the respective paths of the pin form projections 21 and 22, as they move the angular distance between the dotted position 35 and the dotted position 34, in Figure 4.

As the bailing fingers are moved out of the path of the pin form projections, by the same movement the first indexing finger is brought up behind one of the pin form projections on the disk chosen, so that such indexing finger will be in a position similar to the position shown for the indexing finger 32, Fig. 4, and the pin form projection will be at the dotted position 34. And the indexing operation consists in then moving the tumbler disks around the center of the dial shaft the required angular distance for each so that the tumbler slots will align at the proper place when the dial shaft is at its returned stopped position.

The operation of the form of my invention shown in Figs. 7 to 12, both inclusive, differs only from the operation of the simple form of my invention above described, in that, after the combination has been indexed, the next return of the dial shaft brings the cam 59 into action to lift the roller 61 and through the system of levers shown to enter the tumbler arm 56 into the aligned slots. And it is then necessary to bring the kick plate 52 into action, by the manual operation of the indexing dial 48 through a small angle, to trip the latch 12, and free the ratchet 9, so that the tumbler arm 56 is withdrawn from the slots, before the bailing operation, as above described, can be performed.

The kick plate 115 must be used for the same purpose in the form of my invention shown in Figs. 13 to 23, both inclusive, and the bailing operation will then not only bail the combination, but it will also, when the inside handle 73 holds the cam 77 out of operation, project the bolt and leave it locked. This is accomplished by the key form 72 riding up upon the cam 105, and sliding the sliding member 101 into the position where the roller 98 can drop into the track 100, and hold it so that the key form 72 cannot engage the withdrawal side 71 but can only project the bolt by its engagement with the other side of the key slot 70.

In this form, when the combination of the tumbler disks has been properly indexed, the next return of the dial shaft will bring the cam 91 into action to lift the roller 92, and lift the roller 98 from the track 100, and allow the key form 72 to engage both sides of the key slot 70, on the proper motion being imparted manually to the dial shaft. In the event that one or more of the tumbler disks have not been properly indexed, in that event, the lift of the cam 91 will flex the springs 84 and 94, and will stop in the tumbler arm 87, and not lift the roller 98 out of the track 100.

The inside handle 73, when cinched to the dial shaft 1, can also be used to bail the combination by moving the dial shaft through the rotations above described, it can then be used to project the bolt, but its motion must be stopped after the bolt has been projected, that is approximately 135 degrees from the full return stopped position of the dial shaft, then the cinch of the handle on the dial shaft is loosened and the handle, and the cam 77 which moves with it, returned in the reverse direction to the position at which its weight keeps the cam 77 out of action. The mechanism shown in this form can also be operated as a simple bolt by either of two expedients, that is by either leaving the inside handle cinched to the dial shaft, or by limiting the motion manually imparted to the dial shaft so that the key form 72 will not ride all the way to the limit lift of the cam 105.

In accordance with the provisions of the patent statutes, I have herein described the principal and operation of my invention in the forms I consider the best embodiment thereof, but changes in the form, position, size, functions or combinations will not change the principal or sacrifice any of the advantages of my invention.

I claim:

1. A combination mechanism for keyless locks, comprising means for manually indexing the rotative movements of a dial shaft, means for limiting the rotative movements of the dial shaft to maximum movements within approximately 360 degrees, tumbler disks friction held as to their rotative position on the dial shaft, projections on the tumbler disks, fingers adapted to be positioned into and out of the arc of travel of the projections, means for advancing the fingers in a predetermined arrangement into and out of the arc of travel of the projections, means for holding the advance of the fingers against a spring loading, means for releasing the said holding means operative from the means for manually indexing the rotative movements of the dial shaft, from which the means for advancing the fingers is also operative, and means for preventing, except for a small arc of rotation, the contact of a tumbler arm with the tumbler disks.

2. In a keyless lock, a dial shaft, means for manually rotating the dial shaft predetermined angular movements from a stop, a plurality of tumbler disks for locking a bolt, adapted to be changed as to their relative rotative position on the dial shaft, means to change the relative rotative position of the tumbler disks for locking and unlocking a bolt, the said means being characterized by the engagement of projections on the tumbler disks, as the dial shaft is rotated, with fingers positioned, in a predetermined arrangement, into and out of the path of the projections, means for positioning the fingers from rotations of the dial shaft, and means for preventing, except for a small arc of rotation, the contact of a tumbler arm with the tumbler disks.

3. A combination mechanism for a lock comprising tumblers, friction held as to their rotative position on a dial shaft, means for indexing the rotative movements of the dial shaft from a stop, fingers adapted to be set in a predetermined arrangement into and out of the path of projections on the tumblers, the engagement of the fingers with the projections being adapted to index and bail the relative rotative position of the tumblers on the dial shaft, in conjunction with predetermined rotations of the dial shaft, means for setting the fingers in a predetermined arrangement into and out of the path of the projections on the tumblers, said means operative from rotations of the dial shaft, and means for protecting the tumblers from interference by a tumbler bar, except for a small arc, during the rotation of the dial shaft.

4. In a combination lock mechanism, an indexing dial adapted for manual operation to rotate a dial shaft indexed angular distances, means for limiting the rotation of the dial shaft to a maximum rotation of approximately 360 degrees, tumbler disks rotated by the indexing dial and friction coupled for this rotation, fingers adapted to be positioned in a predetermined sequence to be engaged by projections on the tumbler disks to change their relative rotative positions as the dial shaft is rotated, a pawl moved by the rotations of the dial shaft, a ratchet adapted to be advanced by the pawl and positions the fingers, spring means for returning the ratchet to a stopped position, and a latch adapted to hold the advances of the ratchet and adapted to be tripped by the pawl from a predetermined movement of the dial shaft.

5. A keyless locking mechanism having tumbler disks adapted to be bailed and indexed as to their friction held rotative position on a dial shaft, relative to each other and to a stopped position of said shaft, by the positioning by a ratchet, latch and pawl, from rotations of the dial shaft, of two fingers, for each disk, into and out of the arc of travel, during the rotations of the dial shaft, of projections on the tumbler disks.

6. In a keyless lock, an indexing dial adapted for manual operation to rotate a dial shaft predetermined angular distances from a stop, a dial shaft, tumbler disks friction held as to their rotative position on the dial shaft, a spring loaded ratchet adapted to position fingers from a stop, fingers adapted to be positioned into and out of the arc of rotation of projections on the tumbler disks, a pawl on a pivot rotatable by, and around the center of, the dial shaft, and adapted to advance the ratchet, a latch adapted to hold the advances of the ratchet, the pawl being adapted to trip the latch on a predetermined movement of the dial shaft, spring means for returning the dial shaft to a stopped position, means for retarding the speed of such return, a tumbler arm spring loaded away from contact with the tumbler disks, a cam, positioned by the ratchet, at the conclusion of an indexing cycle, to move the tumbler arm, through compensating spring means, to seek entry into slots in the tumbler disks, and a kick plate, carried by the dial shaft on an eccentric pivot, adapted to trip the latch holding the ratchet, on a movement of the dial shaft subsequent to the conclusion of an indexing cycle.

7. In a keyless lock, an indexing dial adapted for manual indexed rotations of a dial shaft from a stopped position, means for automatically returning the dial shaft to a stopped position, a travelling pawl, actuated from the angular movements of the dial shaft, adapted to advance a ratchet and to trip a latch, a ratchet, a latch to hold the advances of the ratchet and adapted to allow the return of the ratchet by a spring to a stopped position when said latch is tripped, tumbler disks friction held as to their rotative position on the dial shaft, provided with tumbler slots and projections, fingers adapted to be positioned into and out of the path of the projections by the advances of the ratchet and its return to stopped position, a tumbler arm, means for moving the tumbler arm to register the alignment of the tumbler slots the said means comprising a cam and compensating spring means between the tumbler arm and the cam to take up the lift of the cam in the event that the tumbler arm cannot enter the tumbler slots, the said cam being positioned to move the tumbler arm at the conclusion of a cycle of indexing rotations of the dial shaft, and a kick plate adapted to prevent, for a predetermined arc of movement of the dial shaft, the contact of the tumbler arm with the tumbler disks, and adapted to trip the latch, on a movement of the dial shaft, upon the entry of the tumbler arm into a notch in the kick plate.

8. A keyless lock having a kick plate adapted to prevent, for a predetermined arc of movement of a dial shaft, the contact of a tumbler arm with tumbler disks, friction held as to their rotative position on the dial shaft, the contact of the tumbler arm with the tumbler disks being actuated, through spring means for compensating for a failure of the tumbler arm to enter into the slots in the tumbler disks, by the lift of a cam at a stage in the advance of a ratchet, the advance of the ratchet operative by pawl means from rotations of the dial shaft, said kick plate adapted, on the entry of the tumbler arm into engagement with a notch in the kick plate, to move, on a further rotation of the dial shaft, on a pivot center eccentric to the center of the dial shaft, and to trip a latch holding the ratchet against its spring loading, allowing it and the cam to return to a stopped position, at which position the tumbler arm is spring held out of contact with the kick plate and the tumbler disks.

9. A keyless lock having a dial shaft carrying tumbler disks friction held in their rotative position thereon, the tumbler disks having pin projections adapted for engagement with fingers and means for making and breaking the engagement of the fingers with the pin projections the said means being operable from predetermined movements of the dial shaft.

10. In a keyless lock, a bolt adapted to be projected by an indexing handle on the outside and by a handle on the inside, both carried on extensions of the dial shaft, the indexing handle being adapted for manual operation to index rotations of the dial shaft, means for limiting such rotations to maximums of approximately 360 degrees, tumbler disks friction held as to their rotative position on the dial shaft and provided with projections, fingers adapted to be positioned into and out of the arc of travel of the projections, a ratchet, spring loaded at a stopped position, adapted to position the fingers and to position the lift of a cam, a pawl, movable with the rotations of the dial shaft, adapted to advance the ratchet on the return of the pawl from each indexing and bailing rotation of the dial shaft and adapted to trip a latch on its return movement from a predetermined rotation of the dial shaft, a latch adapted to hold the advances of the ratchet, a kick plate, pivoted on an eccentric stud in a collar affixed to the dial shaft, having a shoulder adapted to be engaged by a tumbler arm on its drop towards the tumblers, the engagement of the tumbler arm with the shoulder of the kick plate, in conjunction with a further rotation of the dial shaft, adapted to trip the latch, a cam advanced, at a predetermined point in the advance of the ratchet, to lift a cam arm, a tumbler arm connected through a spring to the cam arm to move with it, a bolt withdrawing sliding member, a fixed cam on the housing of the lock adapted to slide the bolt withdrawing sliding member, as it is rotated by the dial shaft, along the dial shaft to a locked position, an arm, spring connected to move with the tumbler arm, adapted to hold the bolt withdrawing sliding member in the locked position, at which said member is adapted only to project the bolt and not to withdraw it, said arm adapted, on the entry of the tumbler arm into slots in the tumbler disks, to free the bolt withdrawing sliding member and allow it, under the action of its spring loading, to assume an unlocked position at which it is adapted to withdraw and project the bolt on proper rotations of the dial shaft from the outside indexing handle and the inside handle, and means operative of said arm against its spring connections to the tumbler arm to free the bolt withdrawing sliding member on the proper setting and rotation of the inside handle.

11. A keyless lock having a cammed surface on the casing concentric about the center of a dial shaft, a bolt withdrawing sliding member adapted to be moved axially along the dial shaft against a spring loading by said cammed surface by a proper rotation of the dial shaft, a holding arm for retaining said bolt withdrawing sliding member in a locked position out of its path of engagement with a withdrawal surface on the bolt and means for freeing said bolt withdrawing sliding member from the holding arm to allow it, under the action of its spring loading, to assume an unlocked position at which it is operable from proper rotation of the dial shaft to withdraw the bolt, said last means operable from an outside index handle upon the alignment of tumbler disks friction held as to their rotative position on the dial shaft, and from the setting and rotation of an inside handle which is not dependent upon the alignment of the tumbler disks.

12. A combination lock mechanism provided with a kick plate adapted to cause the withdrawal of the tumbler registering means upon the failure of the indexing of the tumbler combination substantially as described.

THOMAS P. CONLON.